(12) United States Patent
Wilson et al.

(10) Patent No.: US 8,312,980 B2
(45) Date of Patent: Nov. 20, 2012

(54) HIGH SPEED DIVERTER FOR BAGGAGE CONVEYOR

(75) Inventors: William H. Wilson, Nesbit, MS (US); Thomas M. Phillips, Collierville, TN (US)

(73) Assignee: Diversified Conveyors, Inc., Memphis, TN (US)

( * ) Notice: Subject to any disclaimer, the term of this patent is extended or adjusted under 35 U.S.C. 154(b) by 139 days.

(21) Appl. No.: 12/848,798

(22) Filed: Aug. 2, 2010

(65) Prior Publication Data

US 2012/0024661 A1 Feb. 2, 2012

(51) Int. Cl.
*B65G 47/46* (2006.01)
*B65G 47/82* (2006.01)

(52) U.S. Cl. ............... 198/370.07; 198/598; 198/370.08

(58) Field of Classification Search ............ 198/370.07, 198/370.08, 370.01, 353, 370.09, 598, 367
See application file for complete search history.

(56) References Cited

U.S. PATENT DOCUMENTS

| | | | | | |
|---|---|---|---|---|---|
| 1,729,671 | A | * | 10/1929 | Bell-Irving et al. | 198/367 |
| 4,298,117 | A | * | 11/1981 | Kobayashi et al. | 198/367 |
| 4,711,357 | A | * | 12/1987 | Langenbeck et al. | 209/565 |
| 5,655,643 | A | * | 8/1997 | Bonnet | 198/370.08 |
| 5,988,356 | A | * | 11/1999 | Bonnet | 198/598 |
| 6,974,020 | B1 | * | 12/2005 | Peppel | 198/370.07 |
| 7,506,745 | B1 | * | 3/2009 | McGuire et al. | 198/457.03 |
| 7,819,233 | B2 | * | 10/2010 | Van Schaijk et al. | 198/370.09 |
| 2010/0193323 | A1 | * | 8/2010 | Rogers et al. | 198/347.1 |

* cited by examiner

*Primary Examiner* — Gene Crawford
*Assistant Examiner* — Keith R Campbell
(74) *Attorney, Agent, or Firm* — Maginot, Moore & Beck, LLP

(57) ABSTRACT

An apparatus is provided to facilitate the transfer of baggage on conveyor systems at the junction between a sort conveyor and a take-away conveyor. The transfer apparatus includes a sweeper arm that rotates across the sort conveyor to sweep a baggage article thereon toward the take-away conveyor. The sweeper arm translates linearly relative to the sort conveyor so that the baggage remains in continuous contact with the sweeper arm. The rotation of the arm is coordinated with the translation so that the baggage will be fully diverted from the sort conveyor by the time the sweeper arm reaches the end of its translation.

26 Claims, 4 Drawing Sheets

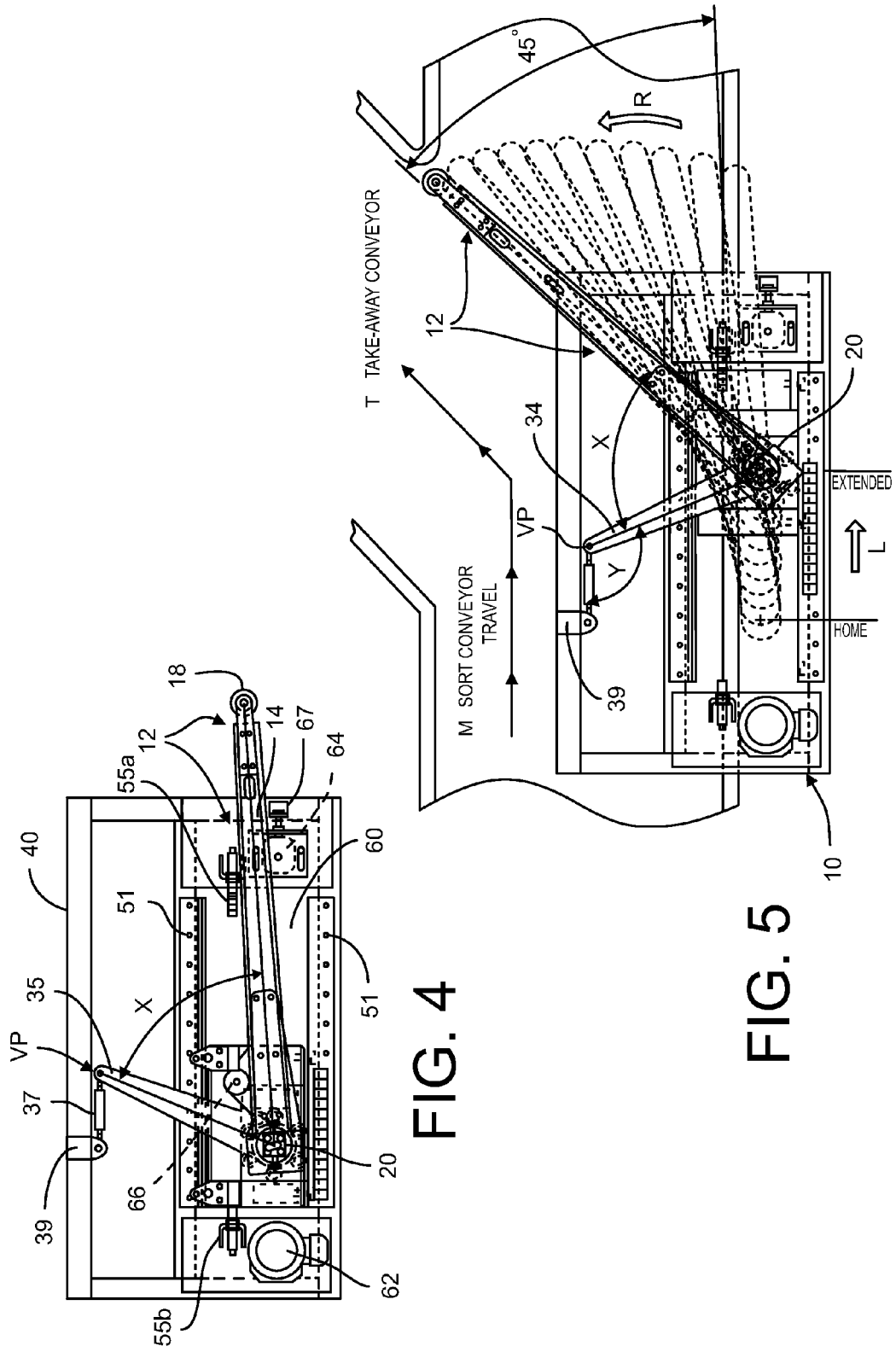

HIGH SPEED DIVERTER FOR BAGGAGE CONVEYOR

BACKGROUND

The present invention relates to baggage conveyor systems, such for use in a transportation terminal. More particularly the invention concerns apparatus and devices for facilitating the transfer of baggage on the conveyors.

In most airports, particularly high traffic facilities, baggage handling involves an extensive array of conveyors that carry luggage and packages, large and small, from check-in to various destinations throughout the airport. Sophisticated systems have been developed to get a particular baggage article to its appointed flight. However, there is no substitute for the conveyor systems that transport the baggage in concert with those sophisticated systems.

A typical conveyor system includes a few sort conveyors with a great number of branch conveyors corresponding, for instance, to each terminal and each gate in that terminal. The baggage is eventually diverted to one of many holding areas where the baggage is loaded onto trucks that haul the baggage to particular airplane. The conveyor system also receives incoming baggage for distribution, for instance, to luggage carousels.

A piece of luggage may be diverted many times from one conveyor to another. In some systems, an arrangement of angled or elevatable conveyor sections is provided to divert baggage from a sort conveyor. These systems require a complicated array of conveyor components. Moreover, these systems typically require greater time to divert a piece of luggage and then return to a start position, which reduces the flow-through of the baggage conveyor system.

Another common approach is to provide a pusher at the junction between conveyors. The pusher is typically arranged to move transversely across one conveyor and in alignment with the intersecting conveyor. Since both conveyors are continuously moving, the transfer must be quick and accurate. Thus, the typical pusher extends and retracts very rapidly. While this approach can accomplish a fairly rapid luggage transfer, it does so with some risk of damage to the luggage. Moreover, there is some risk of fouling as the luggage catches or hangs up and fails to reach the intersecting conveyor. There is a need for an apparatus that efficiently diverts baggage without risk of fouling and with minimal risk of damage to the baggage.

SUMMARY

In accordance with one aspect, a transfer apparatus is provided for use at the junction between a sort conveyor and a take-away conveyor. The transfer apparatus includes a sweeper arm that rotates across the sort conveyor to sweep a baggage article thereon toward the take-away conveyor. The sweeper arm moves in two degrees of freedom, namely translation parallel to the sort conveyor and rotation across the sort conveyor. The sweeper arm translates at the speed of the sort conveyor so that the baggage remains in continuous contact with the sweeper arm. The rotation of the arm is coordinated with the translation so that the baggage has been fully diverted from the sort conveyor by the time the sweeper arm reaches the end of its translation.

DESCRIPTION OF THE FIGURES

FIG. 4 is a top view of the transfer apparatus shown in FIG. 1.

FIG. 5 is a top view of the transfer apparatus shown in FIG. 1 integrated with a conveyor system showing the path of the sweeper arm relative to the main and take-away conveyors

DETAILED DESCRIPTION

Figure 1:
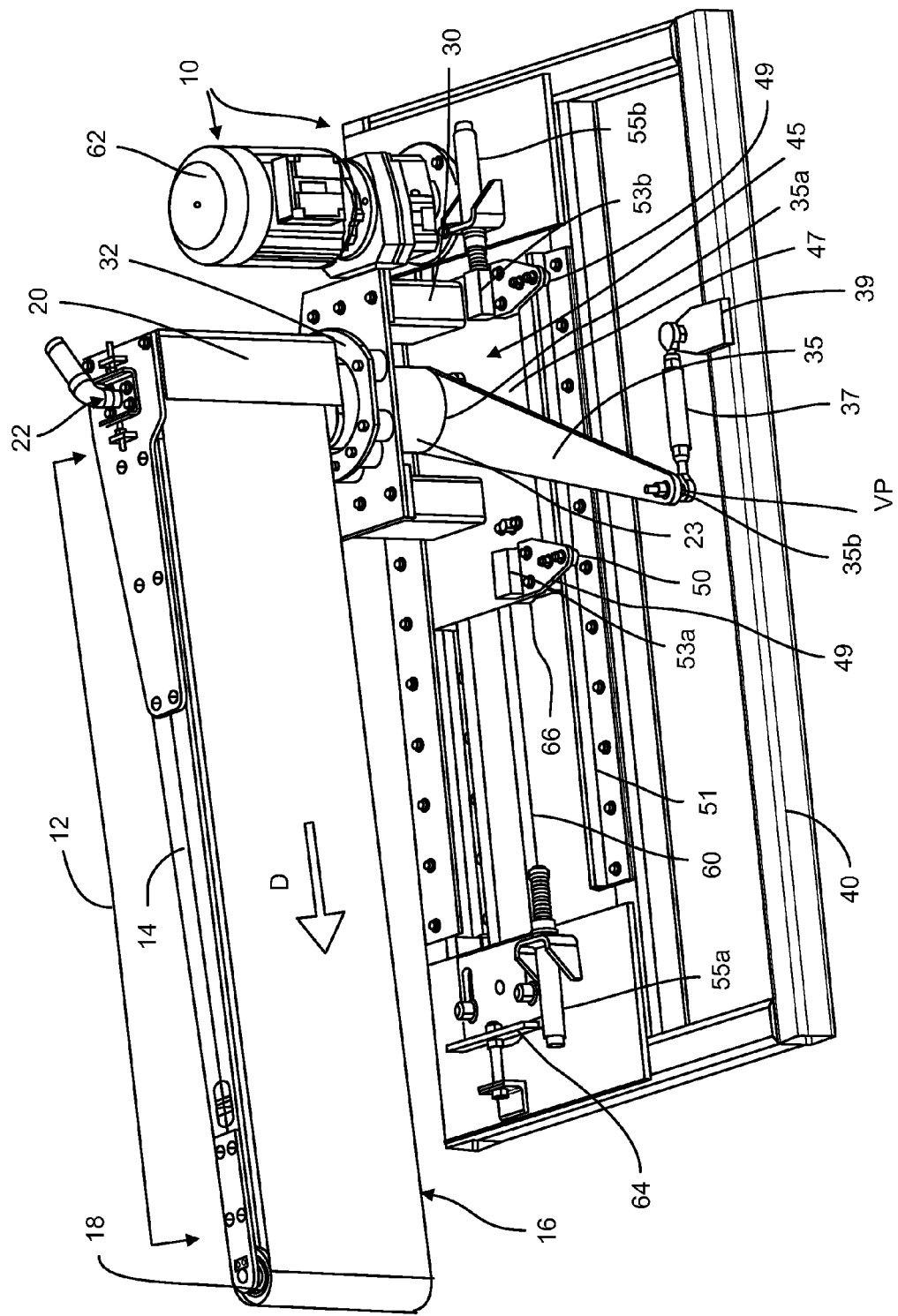
FIG. 1 is a perspective view of a transfer apparatus according to one embodiment of the invention.
Figure 3:
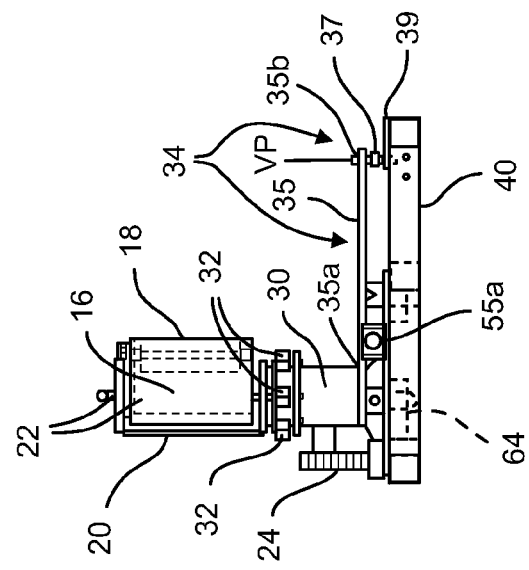
FIG. 3 is an end view of the transfer apparatus shown in FIG. 1.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one aspect, the present invention contemplates a conveyor system that incorporates a transfer apparatus 10, as shown in detail in FIGS. 1-4. The apparatus 10 utilizes a sweeper arm 12 that is supported on a base frame 40 in proximity to a sort conveyor. In particular, as shown in FIG. 5, the apparatus is situated at the intersection between the sort conveyor M and the take-away conveyor T. In particular, the apparatus 10 is arranged so that the sweeper arm 12 overlies substantially the entire width of the sort conveyor, essentially blocking the baggage from traveling anywhere but onto the take-away conveyor T.

Figure 2:
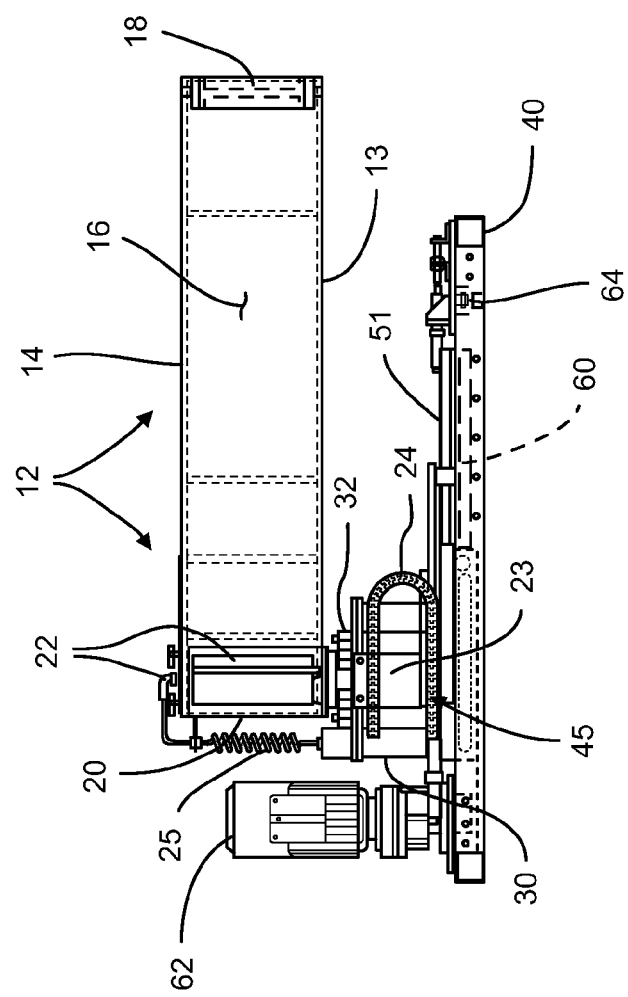
FIG. 2 is a side view of the transfer apparatus shown in FIG. 1.

Returning to FIG. 1, the sweeper arm 12 includes a frame 14 that supports an endless belt 16 spanning from an end roller 18 to a motorized drive pulley assembly 22 disposed within the hub 20. The motorized drive pulley assembly 22 is provided to power the endless belt 16, with electrical power provided to the motorized assembly 22 provided through a flexible wiring harness 24, which accommodates translation of the sweeper arm, and power coil 25, as shown in FIG. 2. The endless belt 16 provides a baggage contact surface that is configured to rotate in a direction D to direct baggage contacted by the sweeper arm 12 toward the take-away conveyor. Thus, the baggage contacts a moving surface of the sweeper arm, which prevents wear or damage to the luggage while facilitating diversion of the baggage to the take-away conveyor T. Alternatively, the sweeper arm may be provided with a fixed contact surface that is formed of a low-friction material to facilitate sliding of the baggage along the sweeper arm 12.

As alluded to above, the sweeper arm 12 is arranged to pivot across the sort conveyor M. However, in one feature of the transfer apparatus, the sweeper arm 12 is supported on a carriage assembly 45 that is itself supported for translation relative to the base frame 40, and ultimately relative to the sort conveyor M. In particular, the carriage assembly is configured to translate the sweeper arm in a direction generally parallel to the direction of travel of the sort conveyor M, as shown in FIG. 5. While the direction of translation of the carriage 45 may include a component toward the conveyor, it must have a substantial component of the translation that is parallel to the direction of travel of the sort conveyor. In particular, the carriage 45 provides means for the sweeper arm 12 to substantially match the speed of baggage traveling along the conveyor as the arm pivots toward the take-away conveyor T.

This aspect of the transfer apparatus 10 provides significant benefits over prior systems. One benefit is that the sweeper arm can more gently "urge" the baggage from the sort conveyor onto the take-away conveyor, rather than having to forcefully push the baggage as required by prior devices. Another benefit is that less inertial force is required to divert the baggage. Prior devices rely upon essentially striking a moving target to disrupt its downstream travel and push the target (baggage) sideways relative to its path of travel. Downstream momentum of the baggage must be substantially instantly stopped while the inertia of the baggage must be overcome to substantially instantly move the baggage sideways. The transfer apparatus 10 of the present invention can incrementally shift the baggage toward the take-away conveyor without disrupting the downstream travel of the baggage. Thus, the apparatus 10 does not need to stop the downstream momentum of the baggage and does not need to instantly overcome the inertia of the baggage to move it sideways. To the contrary, the combined translation and rotation of the sweeper arm 12 allows the apparatus 10 to essentially convert the downstream momentum of the baggage to lateral momentum.

This approach of the present invention allows the sweeper arm to move with less speed and acceleration than the prior devices. This approach also reduces the power requirements to move the baggage with the sweeper arm since it is not necessary to overcome the momentum or inertia of the baggage as it travels on the sort conveyor.

According to one embodiment, the carriage assembly 45 includes a carriage plate 47 that supports the sweeper arm 12. A support assembly 30 is mounted on the carriage plate 47 for movement with the plate. A bearing roller nest assembly 32 may be provided between the hub 20 of the sweeper arm 12 and the support assembly 30. As shown in FIGS. 1 and 2, the hub 20 includes a cylindrical housing 23 that operates as a pivot hub for the sweeper arm. The housing 23 extends through the bearing roller nest assembly 32 and support assembly 30 for connection to the torque arm 35, as described below. In some embodiments, the cylindrical housing is preferable to a solid shaft to absorb the vertical and horizontal torsion imposed by the sweeper arm as it moves through its stroke and is impacted by forces due to moving baggage.

As can be appreciated, the sweeper arm 12 is thus supported on the carriage plate 47 to permit pivoting or rotation of the sweeper arm relative to that plate. The carriage plate is itself supported on the base frame 40 to permit translation of the carriage assembly 45 relative to the base frame. Thus, in one embodiment, the base frame includes a pair of spaced apart rails 51 arranged along the desired translation travel path of the sweeper arm—i.e., preferably substantially parallel to the direction of travel of the sort conveyor M. The carriage assembly includes at least one guide 49 with a roller 50 for engaging a corresponding one of the rails 51. As shown in FIG. 1, there are preferably two such guide and rollers on each side of the carriage plate 47 to stably support the carriage assembly on the rails 51.

The carriage assembly 45 is propelled by a belt 60 driven by a motor assembly 62. The belt 60 is connected between the motor 62 at one end of the base frame 40 and an idler roller 64 at an opposite end of the base frame. The belt is coupled to the carriage assembly by a driven assembly 66, best shown in FIG. 4. The belt 60 may be a chain belt with the driven assembly 66 being a sprocket arrangement. Belt tension may be maintained by a tension adjustment 67 connected to the idler roller 64. The motor 62 rotates the belt 60 which in turn propels the carriage assembly 45 along the rails 51.

The motor assembly 62 is configured to rotate the belt 60 in opposite directions, and ultimately to translate the carriage assembly 45 back and forth along the rails 51. In order to facilitate this reversal of motion, shock absorbers 55a, 55b are provided at the ends of the rails 51 to be contacted by corresponding stops 53a, 53b mounted to the carriage plate 47. As the carriage plate 47 nears the end of a forward stroke the stop 53a contacts the shock absorber 55a which gradually slows the carriage plate down until it comes to a stop. The direction of travel is then reversed and the carriage plate 47 travels toward the shock absorber 55b which acts in the same manner to slow and stop the rearward movement of the carriage assembly.

The motor assembly 62 may incorporate a reversible motor that reverse direction at the end of the forward and rearward strokes. Proximity sensors may be incorporated at the opposite ends of the rails 51 or in the shock absorbers 55a, 55b to provide a signal to a motor controller to reverse the motor. Alternatively, the motor assembly may incorporate a unidirectional motor coupled to a transmission arrangement that converts the motor rotation to reversible motion. The motor in the motor assembly may also be provided with dynamic braking to automatically slow the motor, and thus the carriage assembly, toward the end of a stroke. The use of dynamic braking in the motor will reduce the energy absorbed by the shock absorbers 55a, 55b.

The transfer apparatus 10 further incorporates a synchronization mechanism 34 that synchronizes the pivoting or rotation of the sweeper arm 12 with its translation. This synchronization mechanism mechanically coordinates the pivoting movement of the arm across the sort conveyor with the travel of the arm in the travel direction of the conveyor. Thus, in one embodiment, the synchronization mechanism 34 includes a torque arm 35 connected at one end to the sweeper arm 12 to rotate with the arm. More particularly, the torque arm may be fastened to the housing 23 of the hub 20 of the sweeper arm. The torque arm 35 is connected at end 35a to the sweeper arm at a fixed angle X (FIG. 4) so that rotation of the torque arm directly pivots the sweeper arm 12 relative to the carriage assembly 45.

The opposite end 35b of the torque arm establishes a virtual pivot VP for the torque arm, meaning that the arm pivots about a moving location. In one embodiment, the VP is established by a tie rod 37 that is pivotably mounted to the base frame 40, such as by way of a pivot support 39. The tie rod 37 is thus constrained to rotate or pivot in a fixed arc relative to the pivot mount 39. This movement of the tie rod causes the virtual pivot VP to also move. The length of the tie rod may be adjustable to calibrate the movement of the virtual pivot VP, and ultimately the movement of the torque arm 35 during translation of the carriage assembly 45 and sweeper arm 12. A shorter tie rod length results in a greater angular movement for the sweeper arm, while a longer tie rod produces a smaller angular movement.

In this embodiment, the synchronization mechanism 34 is a mechanical linkage that coordinates rotation or pivoting of the sweeper arm 12 to the translation of the carriage assembly. As the carriage plate 47 moves forward toward the shock absorber 55a (which moves the sweeper arm in the direction of travel of the sort conveyor M), the end 35a must necessarily translate since it is connected to the sweeper arm 12 supported by the support assembly 30 carried by the carriage plate. As the end 35a translates, the fixed length of the torque arm 35 forces the torque arm 35 to pivot about the virtual pivot VP at the end 35b constrained by the tie rod 37, so that the angle Y (FIG. 5) varies (even as the angle X remains fixed). Continued translation of the carriage plate 47 causes greater pivoting of the torque arm 35 and since the torque arm is in a fixed angular relationship to the sweeper arm the sweeper arm 12 pivots through the same angle. Thus, as depicted in FIG. 5, as the sweeper arm translates linearly in the direction L, the synchronization mechanism 34 causes the arm 12 to rotate or pivot in the direction R. The sweeper arm rotates in the opposite direction as the carriage and sweeper arm translate in the opposite direction.

In one embodiment, the sweeper arm 12 pivots through a 45 degree sweep from the start to the end of the linear stroke or travel of the carriage assembly 45. The length of the stroke depends upon various factors, including the speed of the sort conveyor M, the desired extend and retract time, and the desired acceleration and maximum speed of the sweeper arm 12. In one specific embodiment it is desirable for the sweeper arm to fully deploy in 0.5 sec. and to fully retract in the same amount of time. The motor assembly 62 may be configured to linearly accelerate the sweeper arm through the first half of the forward travel (i.e., over 0.25 sec.) and then decelerate the arm through the last half of the forward travel (i.e., over the next 0.25 sec.). In a specific embodiment, the maximum linear speed of the sweeper arm is 80 in/sec., so the motor assembly 62 must accelerate the sweeper arm at about 320 in/sec$^2$ until the maximum speed is reached. The motor assembly decelerates at the same rate until the sweeper arm 12 has reached its full linear stroke and full rotation of 45 degrees across the sort conveyor M. On the return stroke, the motor assembly 62 again accelerates and decelerates the sweeper arm at the same rate over the same 0.25 sec. intervals.

The endless belt 16 on the sweeper arm 12 improves the contact between the baggage and the sweeper arm that is at least initially at a virtual standstill relative to the moving baggage. In other words, until the sweeper arm reaches the maximum translation speed, the contact surface of the sweeper arm is inherently moving slower than the baggage. The same relative speed differential arises as the sweeper arm is retracted. The rotation of the endless belt 16 produces a contact surface that is essentially moving at the same speed as the baggage so that there is no jarring of the baggage when it makes its initial contact with the sweeper arm 12. The belt speed can be adjusted to match or preferably exceed the speed of the baggage, or the speed of the sort conveyor M.

Figure 6:
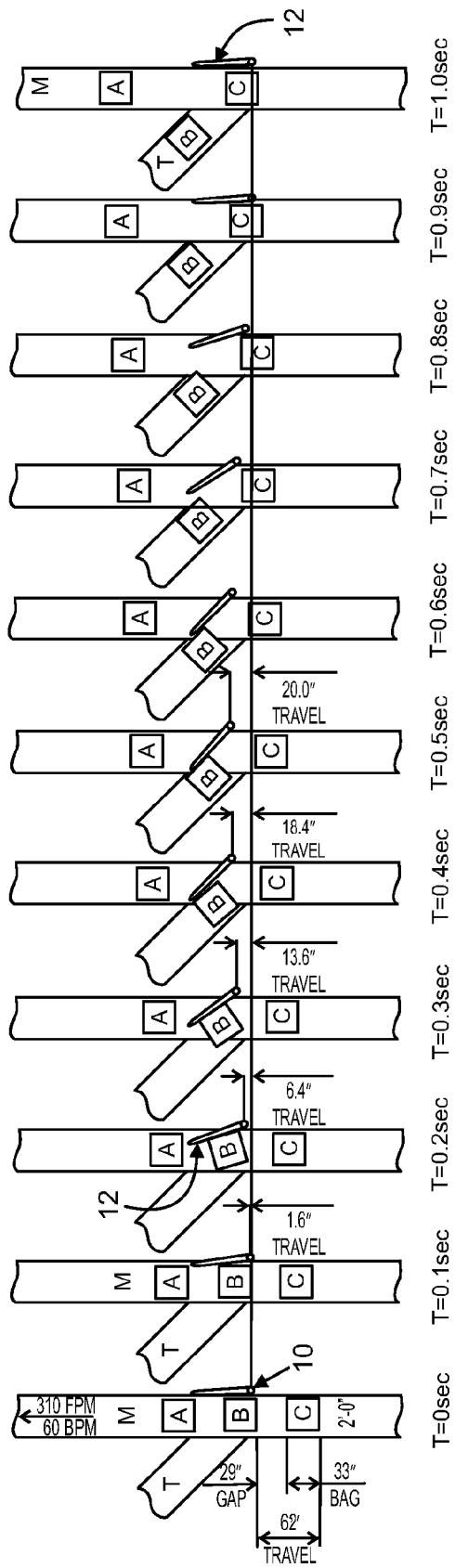
FIG. 6 is a sequence of diagrams showing the relative position of the sweeper arm of the present transfer apparatus as it diverts an article of baggage from the sort conveyor to the take-away conveyor.

It can thus be appreciated that the synchronization mechanism 34 ensures that the sweeper arm 12 pivots in synchronization with its linear movement with the sort conveyor. The effect of this feature of the transfer apparatus 10 is illustrated in the sequential diagrams of FIG. 6. These diagrams depict the position and orientation of the transfer arm 12 over time in relation to baggage A, B, and C. In this example, the baggage is presented on the sort conveyor M at a rate of 60 bags/min. The sort conveyor speed is 62 in/sec. while the take-away conveyor T operates at 68 in/sec. The gap between leading face of baggage on the sort conveyor is about 62 inches, which means that at the sort conveyor speed a new piece of baggage will reach the intersection with the take-away conveyor every second. In this example, then, the transfer apparatus 10 must be capable of extending and retracting within that one second interval to avoid interfering with the next item of baggage or to be reset and able to divert that next item of baggage.

According to this example, at the initial position (T=0) the sweeper arm 10 is situated adjacent the side of the sort conveyor, preferably outside the conveying surface of the sort conveyor to avoid interaction with the baggage. When baggage B approaches the intersection of the sort conveyor M and the take-away conveyor T the transfer apparatus 10 is activated. This activation may be manual but is preferably automatically triggered by a system that evaluates the baggage to determine at what point it is diverted to a take-away conveyor.

Once the transfer apparatus is activated, the drive motor assembly 62 is activated to begin translating the carriage assembly 45, and ultimately the sweeper arm 10. As can be seen in the sequence of diagrams from time T=0 sec. to T=0.5 sec., the sweeper arm translates through about 20 inches of travel, which is less than the linear distance along the sort conveyor M that the baggage B travels during that half-second interval (about 31 inches). However, since the sweeper arm 12 extends downstream across the sort conveyor, this linear travel distance of the sweeper arm is sufficient for the baggage B to be engaged by the take-away conveyor T and pulled off the sort conveyor M.

Once the sweeper arm reaches the end of its forward stroke it immediately begins to retract. Over the next 0.5 seconds the arm accelerates, decelerates and stops. As can be seen in the diagrams from T=0.6 sec. to T=1.0 sec., the sweeper arm remains clear of the next item of baggage C. It can further be appreciated that in the fully retracted position at T=1.0 sec., the sweeper arm 12 is in position relative to the next baggage C to divert that baggage if necessary. Thus, the sweeper arm 12 may be continually activated for several successive items of baggage. In order to ensure quick activation of the motor assembly 62 and thus the sweeper arm 12, the motor assembly may incorporate a clutch arrangement that allows the motor to be constantly running with power transmission only when the clutch is engaged.

It can be appreciated that the linear acceleration of the carriage assembly 45 and ultimately of the sweeper arm 12 also produces angular acceleration of the pivoting sweeper arm. Although the linear acceleration rate may be constant, the angular acceleration will vary throughout the forward and return strokes of the sweeper arm due to the linkage arrangement of the synchronization mechanism 34. Thus, in the specific in the sequence diagrams of FIG. 6, the sweeper arm reaches a peak acceleration of about 13.36 rad/sec$^2$ shortly after movement commences. The angular acceleration remains above 11 rad/sec$^2$ throughout acceleration portion the forward stroke. The angular acceleration is the inverse during the deceleration portion of the forward stroke. In this example, the sweeper arm reaches a maximum angular velocity of about 3.06 rad/sec.

The transfer apparatus 10 is configured to seamlessly integrate into an existing conveyor system. As shown in FIG. 5, the apparatus is mounted beneath the sort conveyor. The pivot point 39 for the tie rod 37 and the starting or home position for the sweeper arm hub 20 may be about 2 inches upstream of the entrance to the take-away conveyor T. The height of the support hub 20 of the sweeper arm 12 is calibrated so that the gap between the lower edge 13 of the sweeper arm and the surface of the sort conveyor M is minimized. As seen in FIG. 2, the lower edge 13 is free of any protrusions below the arm so that sweeper arm can be positioned as close as possible to the conveyor. A minimal gap, on the order of 0.5 in. for instance, ensures that straps and soft baggage will not lodge beneath the sweeper arm 12.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A baggage conveyor system comprising:
   a sort conveyor conveying baggage in a first direction;
   a take-away conveyor intersecting said sort conveyor and conveying baggage in a second direction different from said first direction;
   a transfer apparatus situated at the intersection between said sort conveyor and said take-away conveyor, said transfer apparatus including;
      a carriage supported for translation in a direction generally parallel to said first direction;
      a drive element operable to translate said carriage in said generally parallel direction;
      a sweeper arm supported on said carriage to translate with and pivot relative to said carriage, said sweeper arm arranged to overlay said sort conveyor to contact baggage on said sort conveyor as said sweeper arm pivots relative to said carriage; and
      a pivot mechanism configured to pivot said sweeper arm.

2. The baggage conveyor system of claim 1, wherein said pivot mechanism is configured to mechanically synchronize pivoting of said sweeper arm with translation of said carriage.

3. The baggage conveyor system of claim 2, wherein said pivot mechanism is driven by said drive element.

4. The baggage conveyor system of claim 2, wherein said pivot mechanism includes a linkage connected between said sweeper arm and a pivotable mount at a fixed location relative to said carriage, said linkage configured to pivot said sweeper arm as said carriage translates.

5. The baggage conveyor system of claim 4, wherein said linkage includes:
   an arm having a first end connected to and pivotable with said sweeper arm and an opposite second end; and
   a tie rod having one end pivotably connected to said second end of said arm and an opposite end thereof pivotably mounted at said fixed location.

6. The baggage conveyor system of claim 2, wherein said pivot mechanism includes an arm having a first end connected to and pivotable with said sweeper arm and an opposite second end defining a virtual pivot about which said arm pivots, said virtual pivot configured to move in response to translation of said carriage.

7. The baggage conveyor system of claim 6, wherein said virtual pivot is established by a tie rod having one end pivotably connected to said second end of said arm and an opposite end thereof pivotably mounted at a fixed location relative to said carriage.

8. The baggage conveyor system of claim 2, wherein said pivot mechanism includes an arm coupled to said sweeper arm in a fixed angular relationship, said arm coupled to said sweeper arm at a first end to translate with said sweeper arm, and an opposite second end that is restrained relative to said carriage to apply a torque to said sweeper arm as the sweeper arm translates.

9. The baggage conveyor system of claim 1, wherein said sweeper arm includes a baggage engagement surface sized to span substantially across a width of the sort conveyor when said sweeper arm overlays said sort conveyor.

10. The baggage conveyor system of claim 9, wherein said baggage engagement surface is defined by an endless belt.

11. The baggage conveyor system of claim 10 wherein said endless belt is motor driven.

12. The baggage conveyor system of claim 1, wherein:
   said transfer apparatus includes a base frame, said base frame including a pair of spaced apart rails running generally parallel to said first direction; and
   said carriage includes at least one roller engaging a corresponding one of said rails to support said carriage for translation along said rails.

13. The baggage conveyor system of claim 12, wherein said base frame includes at least one stop situated at the opposite ends of said rails, each stop configured to stop translation of said carriage.

14. The baggage conveyor system of claim 12, wherein said base frame includes at least one shock absorber situated at the opposite ends of said rails, each shock absorber configured to be contacted by said carriage during translation.

15. The baggage conveyor system of claim 1, wherein said drive element includes a drive motor and a belt coupled between said drive motor and said carriage.

16. The baggage conveyor system of claim 15, wherein said drive motor is a reversible motor.

17. The baggage conveyor system of claim 1, wherein said carriage includes:
   a pivot support mounted to said carriage; and
   a bearing assembly for pivotably supporting said sweeper arm on said pivot support.

18. A method for diverting baggage in a baggage conveyor system from a sort conveyor to a take-away conveyor, comprising:
   conveying the baggage with a sort conveyor in a first direction;
   at the intersection between the sort conveyor and the take-away conveyor, the take-away conveyor moving in a second direction different from the first direction, contacting the baggage with a sweeper arm; and
   translating a pivot about which the sweeper arm rotates along the first direction while simultaneously rotating the sweeper arm about the pivot a sufficient distance across the sort conveyor to direct the baggage onto the take-away conveyor.

19. The method for diverting baggage of claim 18, further comprising retracting the sweeper arm by translating and rotating the arm in the opposite direction.

20. The method for diverting baggage of claim 19, wherein the speed of rotation of the sweeper arm is calibrated to extend and retract the sweeper arm without contacting a next successive baggage on the sort conveyor.

21. A baggage conveyor system comprising:
   a sort conveyor conveying baggage in a first direction;
   a take-away conveyor intersecting said sort conveyor and conveying baggage in a second direction different from said first direction; and
   a transfer apparatus situated at the intersection between said sort conveyor and said take-away conveyor, said transfer apparatus including;
      a carriage supported for translation in a direction generally parallel to said first direction;
      a drive element operable to translate said carriage in said generally parallel direction;
      a sweeper arm supported on said carriage to translate with and pivot relative to said carriage, said sweeper arm arranged to overlay said sort conveyor to contact baggage on said sort conveyor as said sweeper arm pivots relative to said carriage; and
      a pivot mechanism configured to pivot said sweeper arm and to mechanically synchronize pivoting of said sweeper arm with translation of said carriage, said pivot mechanism including an arm coupled to said sweeper arm in a fixed angular relationship, said arm coupled to said sweeper arm at a first end to translate with said sweeper arm, and having an opposite second end that is restrained relative to said carriage to apply a torque to said sweeper arm as the sweeper arm translates.

22. A baggage conveyor system comprising:
a sort conveyor conveying baggage in a first direction;
a take-away conveyor intersecting said sort conveyor and conveying baggage in a second direction different from said first direction;
a transfer apparatus situated at the intersection between said sort conveyor and said take-away conveyor, said transfer apparatus including; and
    a base frame including a pair of spaced apart rails running generally parallel to said first direction;
    a carriage supported for translation in a direction generally parallel to said first direction and including at least one roller engaging a corresponding one of said rails to support said carriage for translation along said rails;
    a drive element operable to translate said carriage in said generally parallel direction;
    a sweeper arm supported on said carriage to translate with and pivot relative to said carriage, said sweeper arm arranged to overlay said sort conveyor to contact baggage on said sort conveyor as said sweeper arm pivots relative to said carriage; and
    a pivot mechanism configured to pivot said sweeper arm.

23. The baggage conveyor system of claim 22, wherein said base frame includes at least one stop situated at the opposite ends of said rails, each stop configured to stop translation of said carriage.

24. The baggage conveyor system of claim 22, wherein said base frame includes at least one shock absorber situated at the opposite ends of said rails, each shock absorber configured to be contacted by said carriage during translation.

25. The baggage conveyor system of claim 1, wherein said direction generally parallel to said first direction is linear.

26. The baggage conveyor system of claim 25, wherein said drive element is operable to translate said carriage in said generally parallel direction.

* * * * *